United States Patent [19]

Ishikawa

[11] Patent Number: 4,473,743

[45] Date of Patent: Sep. 25, 1984

[54] MOTOR DRIVE LENS SHIFTING SYSTEM FOR USE IN AUTOFOCUS CAMERA

[75] Inventor: Norio Ishikawa, Osaka, Japan

[73] Assignee: Minolta Camera Kabushiki Kaisha, Osaka, Japan

[21] Appl. No.: 377,789

[22] Filed: May 13, 1982

[30] Foreign Application Priority Data

May 14, 1981 [JP] Japan ................................. 56-73035

[51] Int. Cl.³ ............................................. G03B 3/10
[52] U.S. Cl. .................................... 250/204; 354/402
[58] Field of Search ............... 250/204, 201, 578, 209; 354/402, 404, 406–409; 356/4

[56] References Cited

U.S. PATENT DOCUMENTS

| 4,249,073 | 2/1981 | Stauffer et al. | 250/204 |
| 4,269,491 | 5/1981 | Hagyuda et al. | 354/404 |
| 4,333,007 | 6/1982 | Langlais et al. | 354/402 X |
| 4,414,469 | 11/1983 | Ogasawara | 250/204 |

Primary Examiner—David C. Nelms
Assistant Examiner—Edward P. Westin
Attorney, Agent, or Firm—Jackson, Jones & Price

[57] ABSTRACT

A motor drive lens shifting system includes a picture taking lens, a drive device for driving the lens, a light receiving element for receiving light which has passed through the lens and forming an image thereon, a focus condition detector for detecting the focus condition of the image whether it is front-focus, in-focus or rear-focus, and a control device for controlling the drive device relatively to the detected focus condition such that the drive device first shifts the lens in a wide pitch to roughly adjust the lens position, and then, in a small pitch in steps to precisely adjust the lens position. The steps become gradually small in the manner of geometric progression.

14 Claims, 4 Drawing Figures

MOTOR DRIVE LENS SHIFTING SYSTEM FOR USE IN AUTOFOCUS CAMERA

BACKGROUND OF THE INVENTION

1. Field of the invention

The present invention relates to an autofocus camera and, more particularly, to a motor drive lens shifting system for use in an autofocus camera.

2. Description of the prior art.

Generally, an autofocus camera includes a focus condition detector and a driving motor for driving a camera's objective lens. As the driving motor shifts the objective lens, the focus condition detector detects the focusing condition of an image of a target object to be photographed formed by the objective lens and produces a focus signal which designates in-focus condition, front-focus condition or rear-focus condition. When the focus signal designates in-focus condition, it means that the objective lens is so positioned as to focus the image of the target object sharply on a film plane. However, when the focus signal designates front-focus condition or rear-focus condition, it means that the picture taking lens is so positioned that the image of the target object to be photographed is out-of-focus. More particularly, when the focus signal designates front-focus condition, it means that the objective lens is sharply focused on a point in front of the target object, and when the focus signal designates rear-focus condition, it means that the objective lens is sharply focused on a point at the rear of the target object. The focus signal produced from the focus condition detector is fed to the driving motor to stop the lens shift when the focus signal designating the in-focus is produced.

According to the autofocus camera of the prior art, there is such a disadvantage that the lens is positioned more or less off from the actual in-focus position. In other words, the lens is set in the position which deviates from the proper focusing position. Therefore the image formed on the film surface by the prior art autofocus system would not be as sharp as the image formed by the manual focusing. There are a number of reasons that cause the deviation in the lens positioning, but mainly it is caused by the overrun of the driving motor and by the response time of the focus condition detector, as explained below.

According to the prior art autofocus system, the driving motor, when it is energized, runs very fast to incessantly shift the objective lens. Then, when the driving motor receives the focus signal designating the in-focus condition, the driving motor stops, not instantly, but with a deceleration. As the speed of the driving motor becomes fast, the deviation becomes great.

According to the focus condition detector of the prior art autofocus system, an array of light receiving elements aligned in a line, such as an array disclosed in U.S. Pat. No. 4,249,073, is employed. The array is coupled with a self-scanning type detector and a discriminator. The self-scanning type detector sequentially transfers light signal from each element in the array to the discriminator which then calculates the light signal so as to discriminate whether the lens is in-focus, front-focus or rear-focus. Thus, in the focus condition detector of the prior art autofocus system, it takes about from several 10 msec. to several 100 msec. for the signal transfer and calculation, and such a time is a considerably long time for the control of lens positioning.

In order to overcome the above disadvantage, it has been proposed to drive the motor in the opposite direction after having overrun. If the motor is driven in the opposite direction in the same speed as before, the motor overruns again, because of the same reason explained above, although it may be less than before. By carrying out this operation repeatedly, it is possible to locate the objective lens to the in-focus position without any deviation. However, such a control takes time and, accordingly, it is not appropriate for photography.

SUMMARY OF THE INVENTION

The present invention has been developed with a view to substantially solving the above described disadvantages and has for its essential object to provide an improved motor drive lens shifting system.

It is an important object of the present invention to provide a motor drive lens shifting system which can locate the lens precisely to the proper in-focus position in a very short period of time.

It is also an important object of the present invention to provide a motor drive lens shifting system of the above described type which is compact in size capable of being accommodated in a camera.

In accomplishing these and other objects of the present invention, a motor drive lens shifting system according to the present invention comprises, movable lens provided movably between an infinity focusing position and a closest focusing position, a drive means for driving the movable lens along its optical axis, a light receiving means for receiving light passing through an objective lens sytem including the movable lens, and a focus condition detecting means for detecting a focus condition of the objective lens system based on the image formed on the light receiving means. The focus condition detecting means produces a focus signal indicating a front-focus when the lens is in a front-focus condition, a focus signal indicting an in-focus when the lens is in an in-focus condition and, a focus signal indicating a rear-focus when the lens is in a rear-focus condition.

The motor drive shifting system according to the present invention further comprises a comparing means for comparing a focus signal presently obtained and a focus signal previously obtained. The comparing means produces a comparing signal indicating whether the two focus signals obtained sequentially are identical to each other or not.

A control means is further provided which comprises a direction determining means coupled to the drive means for controlling the direction of lens movement based on the focus signal, and an amount determining means coupled to the drive means for controlling the amount of lens movement based on the comparing signal. The direction determining means effects the drive means to move the movable lens towards infinity focus position upon receipt of a focus signal indicating a front-focus, and effects the drive means to move the movable lens towards the closest focus position upon receipt of a focus signal indicating a rear-focus. On the other hand, the amount determining means decreases an amount of lens movement each time the comparing signal indicates that the two focus signals are not identical to each other. Thus, the lens is shifted to the in-focus condition in a pitch which becomes small each time the direction of lens shift being changed.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE PREFERRED EMBODIMENT

Figure 1:
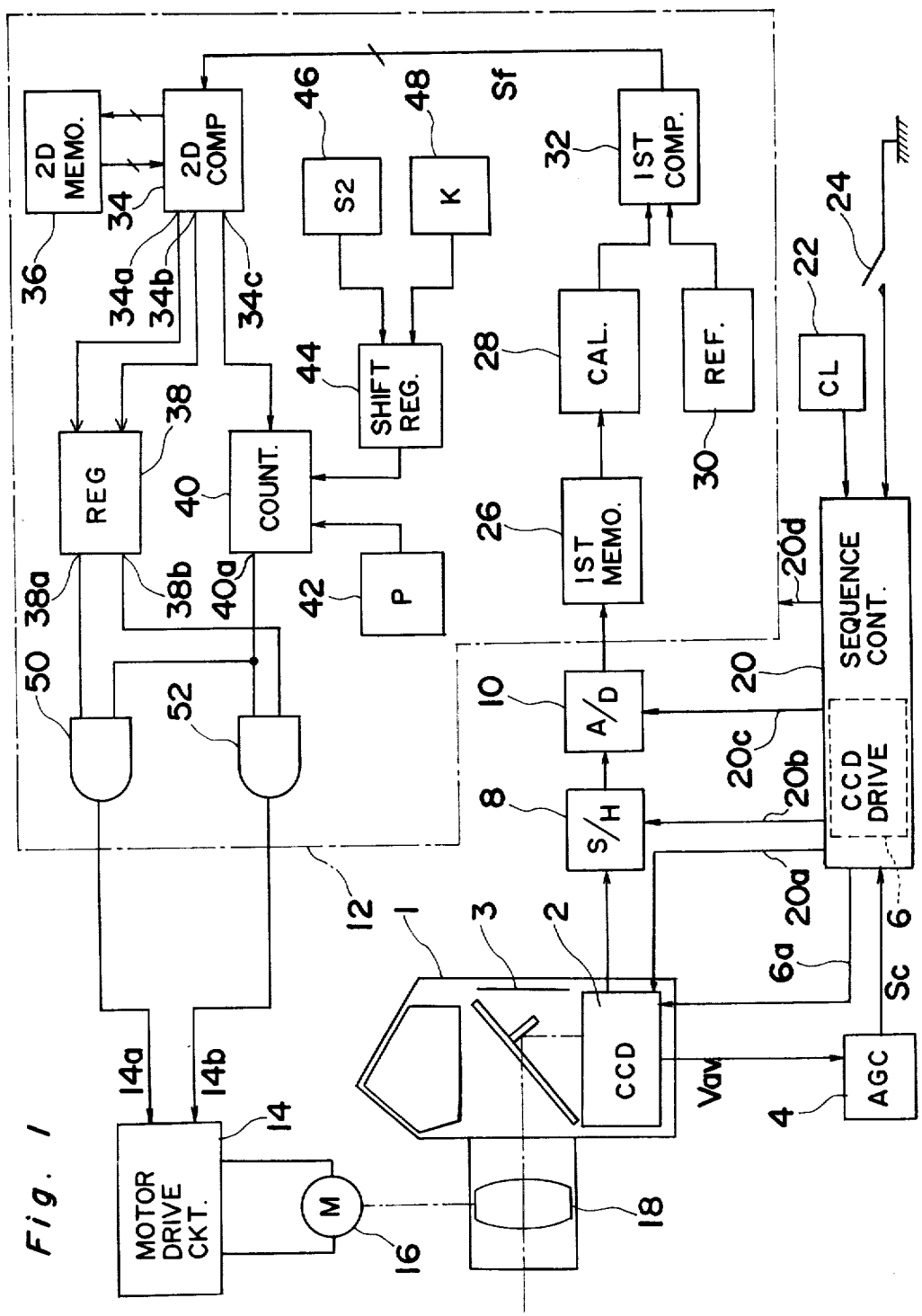
FIG. 1 is a block diagram of a motor drive lens shifting system for use in an autofocus camer, according to the present invention.

Referring to FIG. 1, a motor drive lens shifting system for use in an autofocus camera according to the present invention comprises: a light measuring portion defined by an array of photoelectric sensors 2, an automatic gain control circuit 4, a sensor array drive circuit 6, a sample-and-hold circuit 8 and analog-to-digital converter 10; a processing portion 12 enclosed by a chain line; a motor drive portion defined by a motor drive circuit 14 and a motor 16 for shifting a movable lens 18 of a camera's picture taking lens; and a sequence control portion defined by a sequence control circuit 20 and a clock pulse generator 22. It is to be noted that the above described portions are all accommodated in a camera body 1 and, according to a preferred embodiment, the processing portion 12 and the sequence control portion are formed by a microcomputer including microprocessor. Each of the portions mentioned above will be described in detail below.

First, the sequence control portion is described. The sequence control portion comprises sequence control circuit 20 coupled with clock pulse generator 22 and a switch 24 which is, for example, provided operatively in association with a shutter button (not shown) of the camera. When the switch 24 is turned on, the sequence control 20 is actuated to supply timing pulses from its outputs 20a, 20b, 20c and 20d to carry out the autofocusing operation described later. The turning on of the switch 24 also actuates sensor array drive circuit 6 which supplies a train of pulses to the sensor array 2 through a line 6a to actuate the sensor array 2.

The light measuring portion comprises the array of photoelectric sensors 2, such as a CCD (Charged Coupled Device), so located in the camera body 1 to receive light beams which have been passed through the picture taking lens including the movable lens 18 and at a position such that the optical distance between the objective lens system and the CCD 2 is substantially equal to the optical distance between the lens system and a photograhic film surface 3. Thus, the focus condition on the CCD 2 will be substantially the same as that on the film surface 3. An example of such an array of photoelectric sensors is disclosed in detail in U.S. Pat. No. 4,185,191 to N. L. Stauffer.

When the switch 24 is turned on, the CCD 2 starts to accumulate electric charge with a distribution of electric charge being related to the distribution of light intensity of the image formed thereon. A voltage Vav representing an average of electric charge accumulated in the CCD 2 is incessantly applied to the automatic gain control circuit 4 having a comparator (not shown) and a reference voltage producer (not shown). In the automatic gain control circuit 4, the average voltage Vav is compared with the reference voltage and when the former exceed the latter, the automatic gain control circuit 4 produces a charge completion signal Sc which is applied to the sequence control circuit 20. Upon receipt of the charge completion signal Sc, the sequence control circuit 20 stops the actuation of the CCD drive 6 and, at the same time, produces pulses from lines 20a, 20b and 20c to effect the transfer of electric charge in the CCD 2 to sample-and-hold circuit 8 and further to analog-to-digital converter 10. Thus, the analog-to-digital converter 10 sequentially produces a train of digital signal representing the distribution of light intensity.

The processing portion 12 comprises a first memory 26 for memorizing the digital signal produced from the analog-to-digital converter 10. It is to be noted that the time it takes from the start of actuation of the CCD 2 until the completion of memory of digital signal in the first memory 26 is equal to R1 indicated in FIG. 4. It is also to be noted that such a time R1 may change with respect to the change of brightness of a target object so as to render the signal level within a predetermined range. A calculator 28 receives digital signal from the first memory 26 and calculates focus condition of the objective lens system based on the image formed on the CCD 2. For the purpose of explanation only, it is assumed that the calculator 28 produces a numerical signal representing the focus condition of the lens system such that a positive numerical signal represents front-focus condition, a negative numerical signal represents rear-focus condition, and a zero signal represents true in-focus condition. As the number of the numerical signal becomes greater, the degree of out-of-focus becomes greater. A reference signal producer 30 produces a signal representing a fixed range, such as a range from −5 to +5, in which it is considered that the image is acceptable as a sharp image. It is to be noted that the term "in-focus condition" used herein is understood as a focus condition which falls within said fixed range.

A first comparator 32 is provided. The first comparator receives the numerical signal from the calculator 28 and the signal representing the fixed range from the reference signal producer 30, the discriminates whether the numerical signal is above, within or below the fixed range. If the numerical signal is above the range, that is when the lens system is in the front-focus condition, the first comparator 32 produces a 3-bit signal of (1 0 0). If the numerical signal is within the range, that is when the lens system is in the in-focus condition, the first comparator 32 produces a 3-bit signal of (0 1 0). And, if the numerical signal is below the range, that is when the lens system is in the rear-focus condition, the first comparator 32 produces a 3-bit signal of (0 0 1). Such a 3-bit signal (1 0 0), (0 1 0) or (0 0 1) is generally referred to as a focus signal Sf. And, for the sake of brevity, such 3-bit signals (1 0 0), (0 1 0) and (0 0 1) are also indicated as F, I and R, respectively. The details of the calculator 28, reference signal producer 30 and first comparator 32 are given in U.S. Pat. No. 4,249,073 to Stauffer et al., issued Feb. 3, 1981.

The focus signal Sf is applied to a second comparator 34 which is coupled with a second memory 36. The second comparator 34 has three outputs 34a, 34b and 34c in which the outputs 34a and 34b are connected to a register 38 and the output 34c is connected to a counter 40. The counter 40 is coupled with a one-shot pulse generator 42 for producing a positive-going pulse. The counter 40 is also coupled with a shift-register 44 which is in turn coupled with a ROM 46 carrying a predetermined value "s2" and a ROM 48 carrying another predetermined value "k" which is between zero and one. It is to be noted that the register 38 is provided for controlling the direction of rotation of the motor 16, and the counter 40 and its associated parts 42, 44, 46 and 48 are provided for controlling the amount of rotation of the motor 16. The register 38 has two outputs 38a and 38b which are connected to one input of AND gates 50 and 52, respectively. The counter 40 has one output 40a which is connected to remaining input of each AND gates 50 and 52. The AND gates 50 and 52 are further connected to the motor drive circuit 14 for effecting the rotation of motor 16 in one direction during the AND gate 50 producing a high level, and in the other direction during the AND gate 52 producing a high level.

Generally, the second comparator 34 operates as follows. When the second comparator 34 receives a focus signal Sf from the first comparator, it compares the focus signal Sf with the signal stored in the second memory 36. If the received focus signal Sf is the same as the signal stored in the second memory 36, the second comparator 34 produces such a signal from its outputs 34a, 34b, and 34c as to repeat the same operation in the register 38 and counter 40 as that carried out in the previous operation. If the received focus signal Sf differs from the signal stored in the secondary memory 36, the second comparator 34 produces such a signal as to carry out a different operation in the register 38 and counter 40 than that carried out in the previous operation.

Then, after each comparison, the second comparator 34 transfers the focus signal Sf from the first comparator 32 to the second memory 36 to replace the stored signal with the focus signal Sf just obtained. In this manner, the signal stored in the second memory 36 is renewed after each comparison so that the second comparator 34 can compare the focus signal presently obtained from the first comparator 32 with the focus signal previously obtained in one operation before. According to a preferred embodiment, the focus signal Sf is memorized in a RAM.

In summary, the second comparator 34 determines whether the focus condition has been changed or not during the cycle of operation. A further detailed operation of the second comparator 34 will become apparent from the description given later in connection with FIGS. 3 and 4.

The motor drive portion includes motor drive circuit 14 having two inputs 14a and 14b connected to the AND gates 50 and 51, respectively, and outputs connected to the motor 16. The motor 16 is preferably a pulse motor, and is mechanically connected to the movable lens 18 capable of moving between infinity focus position and the closet focusing position. A detail of the motor drive circuit 14 is shown in FIG. 2.

Figure 2:
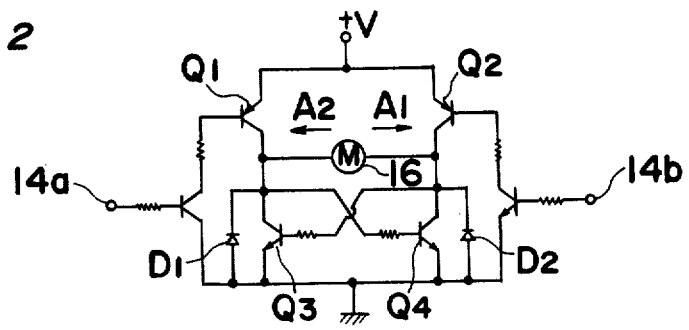
FIG. 2 is a circuit diagram showing a detail of a motor drive circuit shown in the block diagram of FIG. 1.

Referring to FIG. 2, when the inputs 14a and 14b receive high and low level signals, respectively, transistors Q1 and Q4 becomes conductive, and transistors Q2 and Q3 become non-conductive. Accordingly, a pulsating electric current from a power source +V flows through the motor 16 in a direction indicated by an arrow A1. Thus, the motor 16 rotates in one direction to advance the movable lens 18 (FIG. 1) towards the infinity focus position.

On the other hand, when the inputs 14a and 14b receive low and high level signals, respectively, transistors Q1 and Q4 become non-conductive, and transistors Q2 and Q3 become conductive to rotate the motor 16 in the other direction to advance the movable lens 18 towards the closest focus position.

It is to be noted that the diodes D1 and D2 are provided for preventing the transistors Q3 and Q4 from being damaged by a reverse electromotive forace generated by the motor 16 when signals applied to the inputs 14a and 14b are inversed.

Figure 3:
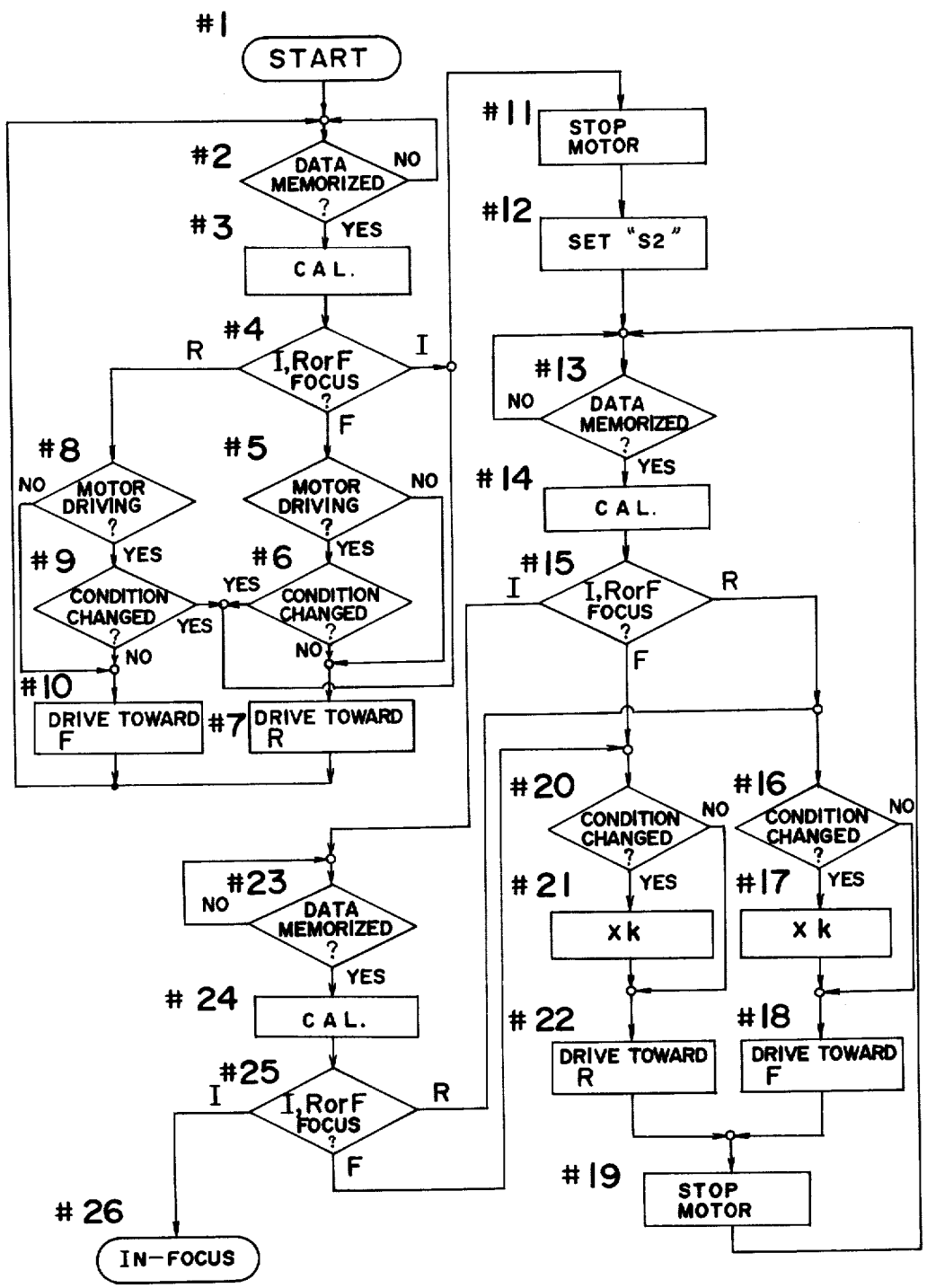
FIG. 3 is a flow chart showing steps to carry out the autofocusing operation by the lens shifting system of the present invention.

Next, the operation of the motor drive lens shifting system is described from a general view point with reference to FIGS. 1 and 3.

In the step #1, shown in FIG. 3, the switch 24 is turned on and, accordingly, the second memory 36 is cleared and stored initially with a 3-bit signal (0 0 0) and, at the same time, upon turning on of the switch 24, the light measuring portion is actuated to sequentially memories the train of digital signals representing the distribution of light intensity in the first memory 26. When the digital signals, or data, are memoried in the first memory 36, the step advances from #2 to #3 to carry out the calculation in the calculator 28 and to produce a focus signal Sf from the first comparator 32.

Then, in the step #4, it is discriminated by a microcomputer whether the focus signal Sf is F(1 0 0), I(0 1 0) or R(0 0 1). If the foccus signal Sf is discriminated as F(1 0 0) indicating the front-focus condition, the microcomputer further discriminates whether the motor 16 is driving or not. In the first cycle of operation, the motor 16 is not driven and, therefore, the procedure advances to step #7 to drive the motor 16 in a direction so as to shift the lens towards R, that is, towards the infinity focus position in a wide step "S1".

The driving of the motor 16 is carried out as follows. The second comparator 34 compares the newly obtained focus signal F(1 0 0) with the initially stored signal (0 0 0), and determines that these two signals differ from each other. Thus, in this case, the second comparator 34 produces from its outputs 34a and 34b a 2-bit signal (1 0) based on the newly obtained focus signal F, and a high level signal from its output 34c. The 2-bit signal (1 0) produced from the outputs 34a and 34b is applied to the register 38 which then starts to produce the 2-bit signal (1 0) from its outputs 38a 38b until it receives a new 2-bit signal from the second comparator 34. The high level signal from the output 34c is applied to the counter 40. Since the motor 16 is not running, the high level signal applied to the counter 40 is transferred to the output 40a of the counter 40 and further to the AND gates 50 and 52. As a consequence, the AND gate 50 is actuated and the AND gate 52 remains non-actuated. Accordingly, the motor 16 starts to rotate to shift the lens 18 towards the infinity focus position.

In the meantime, the microcomputer replaces the inital 3-bit signal (0 0 0) with the discriminated focus signal F(1 0 0).

Back again to the step #4, if the focus signal Sf is discrimanated as R(0 0 1) indicating the rear-focus condition, the microcomputer proceeds in a similar manner described above by way of step #8 and #10, but in this case to drive the motor 16 in the opposite direction so as to shift the lens towards F, that is, towards the closest focus position. To effect the motor drive in the opposite direction, the second comparator 34 produces in this case a 2-bit signal (0 1) from its outputs 34a 34b.

In this case, the microcomputer replaces the inital 3-bit signal (0 0 0) with the newly obtained focus signal R(0 0 1).

Furthermore, if the focus signal Sf is discriminated as I(0 1 0) indicating the in-focus condition, the procedure jumps to step #11 which will be described later and, this case, the microcomputer replaces the initial 3-bit signal (0 0 0) with the in-focus signal I(0 1 0).

When the foregoing procedure completes, the first cycle of operation is completed and, if the first cycle of operation has taken the step #7 or #10, the procedure returns back to the step #2.

In the second cycle of operation starting from the step #2, the light measuring portion is actuated again to store a new data in the first memory 26. Then, a similar calculation is carried out in the step #3. And, in the step #4, it is discriminated whether the focus signal Sf is R, F or I. If it is discriminated as F, the procedure advances to the step #5, and further to the step #6 since the motor 16 is now running. In the step #6, the second comparator 34 compares the obtained focus signal Sf (in this case F) with the stored focus signal Sf in the second memory 36. If these two signals are identical with each other, that is when there is no change in the focus condition, the procedure advances to the step #7 to further shift the lens 18 towards the infinity focus position. On the contrary, if these two signals differ from each other, that is when the focus-condition is changed, the step jumps from #6 to #11 to stop the motor 16.

A similar operation is carried out when the focus signal Sf is discriminated as R in th step #4.

The foregoing completes the second cycle of operation.

It is to be noted that the above described steps #2 to #10 are provided to shift the lens 18 in wide step "S1" in each cycle of operation to roughly control the lens position. Here, although the term "step" is used to described the movement of the lens, actually, the lens, when it is once started to move, moves smoothly in a constant speed during the repetition of the procedure of steps #2 to #10 until the procedure jumps to step #11 to stop the lens movement.

Then, in the next cycle of operation, referred to as a third cycle of operation, the procedure follows the step #11 and #12.

In the step #11, the second comparator 34, which has made such a discrimination in the previous step #6 or #9 that the obtained focus signal Sf is identical with the focus signal memorized in the second memory 36 or that the obtained focus signal Sf is I in the step #4, produces a 2-bit signal (1 0) or (0 1) from the outputs 34a and 34a and a signal for actuating the pulse generator 42 from the output 34c. The 2-bit signal (1 0) is produced when the 2-bit signal previously produced from the outputs 34a and 34b is (0 1), and the 2-bit signal (0 1) is produced when the 2-bit signal previously produced from the outputs 34a and 34b is (1 0). Thus, the register 38 produces the 2-bit signal which will effect the motor 16 to rotate in a direction opposite to the direction of rotation that has been effected during the procedure of steps #2 to #10. The amount of rotation is determined by the duration of pulse produced from the pulse generator 42. The pulse produced from the pulse generator 42 is transferred through the counter 40 and applied to each input of the AND gate 50 and 52. It is to be noted that the duration of the pulse is so short as to provide only the braking effect to the motor 16. Therefore, when such a pulse is applied to the motor drive circuit 14 with the motor 16 being stopped, the motor 16 will not make any movement or, even if it did, such a movement will be so small that it can be disregarded.

Then, in the step #12, the shift register 44 is set with the value "s2" obtained from the ROM 46. Thus, the counter 40 when actuated, is capable of counting the value "s2".

As stated above, the steps #11 and #12 are provided to give a braking effect to the motor 16, and to set the shift register 44 with a value "s2" so that the counter 40 is ready to count the value "s2" in the next, i.e., fourth cycle of operation.

Figure 4:
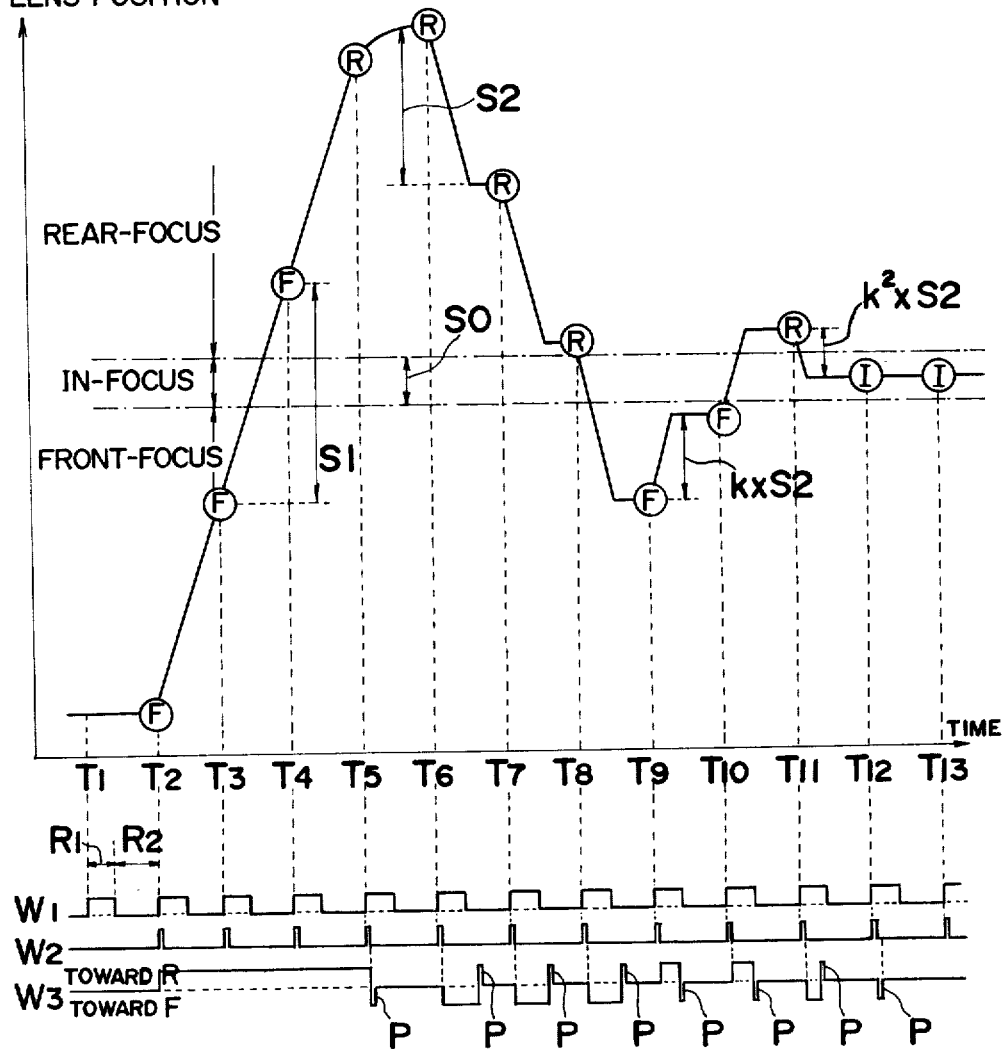
FIG. 4 is a graph showing a change of lens position in a timed relation.

The fourth cycle of operation starts from the light measuring carried out in the light measuring portion in a similar manner described above. The steps #13, #14 and #15 carry out the same procedure as the steps #2, #3 and #4. Thus, in the step #15, the second comparator 34 compares the newly obtained focus signal Sf with the focus signal memoried in the second memory 36 in the previous cycle of operation. Assuming that the memorized focus signal is R and the newly obtined focus signal is R, the procedure follows the steps of #16 and #18 because there is no change in the focus condition. In this case, in the step #16, the second comparator 34 produces a 2-bit signal (0 1) from the outputs 34a and 34b and, at the same time, a signal for actuating the counter 40 is produced from the output 34c. Furthermore, the second comparator 34 replaces the newly obtaind focus signal R with the memorized focus signal R. Then, in the step #18, the counter 40 provide a high level signal to the AND gates 50 and 52 for atime period of "s2", and the register 38 provides a high level signal from the output 38b to the AND gate 52. Thus, the AND gate 52 produces a high level signal for a time period of "s2" to drive the motor 16 effecting the lens shift toward the closest focus position with a predetermined step length "s2" which is shorter than the step "S1", but longer than the in-focus region S0 (FIG. 4).

After counting the period "s2", the counter 40 produces a pulse obtained from the pulse generator 42 and, at the same time, the register 38 which has been producing the 2-bit signal (0 1) starts to produce a 2-bit signal (1 0) to provide a braking effect to the motor 16. Thus, the motor 16 stops running after shifting the lens toward the closest focus position by the step "S2". This braking is effected in the step #19. Thereafter, the procedure returns back to the step #13 to start a next, i.e., a fifth cycle of operation.

The fifth cycle of operation starts again from the light measuring carried out in the light measuring portion, amd the step #13, #14 and #15, a similar operationas before is carried out. Assuming that the first comparator 32 produces a focus signal F, the procedure advances from the step #15 through the steps #20, #21 and #22 to the step #19. In the step #20, the second comparator 34 compares the newly tobtained focus signal F with the stored focus signal R and discriminates that the focus condition has been changed to front-focus condition. Thus, the second comparator produces a 2-bit signal (1 0) from the outputs 34a and 34b and, at the same time, it produces a signal for actuating the counter 40 from the output 34c. Furthermore, the second comparator 34 replaces the focus signal R memorized in the second memory 36 with the newly obtained focus signal F. In the step #21, the value "k" is read from the ROM 48 for carrying out the multiplication of data stored in the shift register 44 times k, i.e., (s2×k). Since "k" is between zero and one, the moving length becomes is less than 37 s2". And, such a product is stored in the shift register 44 as a new data to effect the counting in the counter with the value (s2×k). Then, in the step #22, the register 38 produces the 2-bit signal (1 0) and the counter 40 produces a high level signal during its counting of the value (s2×k). Thus, the AND gate 50 produces a high level signal for a time period (s2×k) to drive the motor 16 in the direction to effect the lens shift towards the infinity focus position by a step of "S2×k". As apparent from the foregoings, the step "S2×k" is less than the step "S2". Thereafter, the motor 16 stops in the step #19 and, thus, the procedure returns back again to the step #13 to start a next cycle of operation, i.e., sixth cycle of operation.

The sixth cycle of operation starts again from the light measuring and follows the steps #13, #14 and #15. In the step #15, the second comparator 34 compares the newly obtained focus signal Sf with the focus signal stored in the previous cycle of operation, i.e., focus signal F. Assuming that the newly obtained focus signal is R, the procedure follows the steps #16, #17 and #18. In the step #16, the second comparator 34 produces from its outputs 34a 34b a 2-bit signal (0 1) based on the newly obtained focus signal R and, at the same time from its output 34c a signal for actuating the counter 40. Furthermore, the second comparator 34 replaces the memorized focus signal F with the newly obtained focus signal R. Then, in the step #17, the value "k" is read again from the ROM 48 for carrying out the multiplication of data stored in the shift register times k, i.e., (s2×k²). The product (s2×k²) is stored in the shift register 44 as a new data to effect the counting in the counter 40 with the new data. Then, in the step #18, the register 38 produces the 2-bit signal (0 1) and the counter 40 produces a high level signal during its counting of the value (k²×s2). Thus, the AND gate 52 produces a high level signal for a time period (s2×k²) to run the motor 16 in the direction to effect the lens shift towards the closest focus position by a step of "S2×k²". As apparent from the foregoings, the step "S2×k²" is less than the step "S2×k". Thereafter the motor stops in the step #19, and then, the procedure returns back again to the step #13 to start a next cycle of operation, i.e., seventh cycle of operation.

As understood from the above, the steps #13 to #22 are provided to shift the lens in steps which become shorter each time the direction of lens shift is reversed. In other words, the steps #13 to #22 are provided to converge the position of the lens towards in-focus position.

The seventh cycle of operation starts again from the light measuring carried out by the light measuring portion, and in the steps #13, #14 and #15, a similar operation as before is carried out. Assuming now that the first comparator 32 produces an in-focus signal I, the procedure advances from the step #15 to the step #23. Then, from the step #23 a new cycle of operation, i.e., a eighth cycle of operation starts.

In the eighth cycle of operation, the procedure follows the steps of #23, #24 and #25 which are the same as the above described steps #13, #14 and #15. In the step #25, it is again discriminated whether the newly obtained focus signal Sf is I, R or F. If the focus signal is discriminated as R or F, the procedure returns to the step #16 or #20, respectively, but if the focus signal is discriminated as I, the procedure advances to the step #26 which is the end of the flow chart. At this time, the lens is located properly in the in-focus position.

The step #23, #24 and #25 are provided to check whether the lens is temporarily shifted to the in-focus position, or whether it is finally shifted to the in-focus position as a result of convergent movement of the lens. In other words, the termination of the lens to the proper in-focus condition is determined only when the focus signal I is detected in two successive operations.

It is to be noted that the operation cycle number in the above description is used merely to distinguish one cycle of operation from the others and, therefore, such a number does not indicate the order of operation.

Next, the operation of the motor drive lens shifting system is described using a concrete example with reference to FIGS. 1 and 4.

Referring to FIG. 4, a graph showing a relationship between lens position and time is given. A belt defined by two parallel chain lines represents an in-focus region S0, and above the belt is rear-focus region and below the belt is front-focus region. The moments T1 to T13 shown along the abscissa indicate the start of each cycle of operation. Circles in the line with a character F, R or I indicate the result of discrimination.

Below the graph, three waveforms W1, W2 and W 3 are shown. The waveform W1 shows a period R1 in which the light measuring is carried out and a period R2 in which the calculation and discrimination is carrid out. It is to be noted that, unlike the period R1, the period R2 is maintained constant regardless of the brightness of the aiming subject.

The waveform W2 shows a train of pulses which controls the reading and transfer of the calculated and discriminated result to the motor drive portion through the second comparator 34, register 38, counter 40 and AND gates 50 and 52. It is to be noted that, after having being read, the result of the discrimination is immediately cleared to prevent the reading of the same result repeatedly.

The waveform W3 shows a condition of motor 16. More particularly, when a solid line is depicted over a center dotted line, the motor 16 is in a stopped condition; when the solid line is depicted above the center dotted line, the motor 16 is rotated to shift the lens towards the infinity focus position; and when the solid line is depicted below the center dotted line, the motor 16 is rotated to shift the lens towards the closest focus position. In the waveform W3, a pulse P shown immediately after the rotation of the motor 16 is provided to give a braking effect to the motor 16. As understood from the above, such a pulse P is produced due to the pulse generated by the pulse generator 42.

Initially, it is assumed that the lens 16 is located in the front-focus region. When the switch 24 is turned on at the moment T1, the light measuring portion is actuated in the period R1 (steps #1 and #2). Then, the calculation and discrimination is carried out in the period R2 (steps #3 and #4). Thereafter, at about the moment T2, the result of the discrimination, in this case front-focus, is produced to effect the start of lens shift towards rear-focus region (steps #5 and #7). During the lens shift, the light measuring portion is actuated again for the second cycle of operation (step #2). Then, the calculation and discrimination are carried out (steps #3 and #4) and, at about the moment T3, a next result, which is front-focus, is obtained. Since there is no change in the discriminated result, the lens is shifted continuously towards rear-focus region (steps #5, #6 and #7). Therefter, the same cycle of operation is carried out in a period between the moments T3 and T4. In this period, the lens is shifted across the in-focus region S0, but since the light measuring is carried out in the front-focus region, the result of the discrimination obtained at the memont T4 is again front-focus. Thus, the lens is further shifted towards rear-focus region in the next cycle of operation, i.e., in a period between the moments T4 and T5. In this period, the light measuring is carried out in the rear-focus region and, therefore, the result of the discrimination obtained at the moment T5 is rear-focus (steps #2, #3, #4, #8 and #9) so that the braking effect is applied to the lens (steps #11 and #12) immediately after the moment T5.

Then, during a period between the moments T5 and T6, the light measuring, calculation and discrimination are carrid out (steps #13, #14 and #15), and an obtained result at about the moment T6 is R indicating the rear-focus region. Now, the system is ready for shifting the lens in the opposite direction with a pitch S2 shorter than the previous pitch S1.

In the next period between the moments T6 and T7, the lens in shifted in a step towards front-focus region (steps #16, #18 and #19). Thereafter, the same cycle of operation is carried out in a period between moments T7 and T8. In a next period between moments T8 and T9, the light measuring (step #13) is carried out partly in the front-focus region and, therefore, the result of the discrimination (steps #14 and #15) is front-focus. Thus, it is discriminated by the second comparator 34 that the focus-signal has changed from R to F (step ∩20) and, therefore, the pitch S2 is reduced to the pitch $k \times S2$ (step #21) and the direction of rotation is reversed to shift the lens towads rear-focus region (step #22). After the lens is shifted by the pitch $k \times S2$, it is stopped (step #19). During the lens shift is a period between moments T9 and T10, the light measuring is carried in the front-focus region and, therefore, the result of the discrimination is again F (steps #13, #14 and #15). Since the focus condition is not changed (step #20), the lens is shifted by the same pitch $k \times S2$ in the same direction (steps #21, #22 and #19) as before. During the lens shift in a period between moments T10 and T11, the light measuring is carried out partly in the rear-focus region and, therefore, the result of the discrimination (steps #13, #14 and #15) is R. Thus, the second comparator 34, register 38 and counter 40 are so operated as to further reduce the pitch to $k^2 \times S2$, and to reverse to direction of lens shift towards front-focus region (steps #16, #17 and #18). After the lens is shifted by the pitch $k^2 \times S2$, it is stopped (step #19). During the lens shift in a period between moments T11 and T12, the light measuring is carried out in the in-focus region and, therefore, the result of the discrimination is I (steps #13, #14 and #15). Thus, in the next cycle of operation carried out in a period between moments T12 and T13, the lens is held still and, the light measuring is carried out again (step #23). Since the lens is now located in the in-focus region, the result of the calculation and discrimination (steps #24 and #25) is I and, thereupon, the system completes the control of lens shift (step #26).

As understood from the foregoings, the direction of lens shift changes each time the second comparator 34 discriminates the the focus condition changed. Furthermore, the pitch of the lens shift decreases in the manner of geometric progression.

It is to be noted that when the lens is shifted by the step S1 as effected in the period bettween T2 and T5, the motor reaches its maximum speed and, therefore, when it is required to stop the lens, the lens overruns for a some degree, as shown in the period betwween T5 and T6. Such a overrun is caused by the inertial of the moving elements. However, when the lens is shifted by the step S2, $k \times S2, k^2 \times S2$, or $k^n \times s2$, the motor 16 is forced to stop before it reaches the maximum speed and, therefore, the lens stops with a very small or no overrun. Therefore, the lens can be terminated at a desired positon.

Since the motor drive lens shifting system according to the present invention conrols the lens position first roughly and, then precisely, the lens can be shifted to the in-focus region in a high accuracy in a very short period of time.

Although the present invention has been fully described with reference to the preferred embodiment, many modifications and variations thereof will now be apparent to those skilled in the art, and the scope of the present invention is therefore to be limited not by the details of the preferred embodiment described above, but only by the terms of appended claims.

What is claimed is:

1. A motor drive lens shifting system for use in an autofocus camera for automatically focusing an objective lens system of the camera in a proper focus condition comprising:

focusing lens included in the objective lens system and provided movably along an optical axis of the objective lens system;

means having an driving motor for driving the focusing lens for focusing;

means for receiving light passed through the objective lens system;

means for detecting a focus condition of the objective lens system based on a light receiving condition of the light receiving means, said focus condition detecting means producing a focus signal indicating one of three conditions in which the objective lens system is in front-focus condition, in in-focus condition and in rear-focus condition, respectively;

means for comparing a focus signal presently obtained and a focus signal previously obtained, said comparing means producing a comparing signal indicating whether said two focus signals obtained sequentially are identical to each other or not; and means for controlling both of a shifting direction and a shifting amount of the focusing lens shifted by the driving means, wherein said control means includes, means coupled to the driving means for determining the shifting direction of the focusing lens based on the focus signal, said shifting direction determining means effecting the driving means to shift the focusing lens towards its infinity focus position upon receipt of a focus signal indicating a front-focus condition, and effecting the driving means to shift the focusing lens towards it closest focus position upon receipt of a focus signal indicating a rear-focus condition; and means coupled to the driving means for determining the shifting amount of the focusing lens based on said comparing signal; said amount determining means decreasing an amount of lens shifting each time said comparing signal indicates that said two focus signals are not identical to each other;

whereby said lens means is shifted to said in-focus condition in a pitch which becomes smaller each time the direction of lens shift is changed.

2. A motor drive lens shifting system as claimed in claim 1, wherein said objective lens system is provided in association with a predetermined focal plane on which an image is formed, said light receiving means being located at a position such that the optical distance between said objective lens system and said light receiving means is substantially equal to the optical distance between said objective lens system and said predetermined focal plane.

3. A motor drive lens shifting system as claimed in claim 1, wherein said comparing means comprises a memory member and a comparing member, said memory member memorizing a focus signal obtained in a previous cycle of operation and said comparing member comparing said focus signal in said memory member with a focus signal newly obtained from said focus condition detecting means, said memory member replacing said focus signal with said newly obtained focus signal after said comparison.

4. A motor drive lens shifting systems as claimed in claim 1, wherein said control means comprises first and second output terminals for producing a control signal selectively from one of said first and second output terminals, said focusing lens being shifted towards its infinity focus position when said control signal is produced from said first output terminal, and said focusing lens being shifted toward its closest focusing position when said control signal is produced from said second output terminal, said control signal being produced during a selected period of time in accordance with the shifting amount determined by the amount determining means.

5. A motor drive lens shifting system as claimed in claim 1, wherein said control means further comprises first and second AND gate means, said first AND gate means being actuated when said direction determining means receives a focus signal indicating a front-focus condition, and said second AND gate means being actuated when said direction determining means receives a focus signal indicating a rear-focus condition, and first and second AND gate means being connected to said driving means.

6. A motor drive lens shifting system as claimed in claim 5, wherein said amount determining means produces a control signal for a selected time period to each of said first and second AND gate means, whereby when said first AND gate means is actuated, said control signal is applied to said driving means to drive said focusing lens element towards its infinity focus position for said selected time period, and when said second AND gate means is actuated, said control signal is applied to said driving means to drive said focusing lens element towards its closest focusing position for said selected time period.

7. A motor drive lens shifting system as claimed in claim 1, wherein said amount determining means decreases said amount of lens shifting by a predetermined constant rate each time the direction of lens shift being changed.

8. A motor drive lens shifting system as claimed in claim 1, wherein said driving means comprises an electric motor capable of being driven in both of forward and reverse directions, said electric motor being mechanically connected to said focusing lens, whereby the direction of lens shift is controlled by the direction of rotation of the motor, and the amount of lens shift is controlld by the rotational amount of said electric motor.

9. A motor drive lens shifting system as claimed in claim 8, wherein said direction determining means controls the direction of rotation of said electric motor, and said amount determining means controls the rotational amount of said electric motor.

10. A motor drive lens shifting system as claimed in claim 9, wherein said amount determining means controls the rotational amount of said electric motor by means of controlling a driving time of said electric motor.

11. A motor drive lens shifting system as claimed in claim 10, wherein said control means further comprises first and second AND gate means each having two inputs and one output, said direction determining means having first and second output terminals connected to the first inputs of said first and second AND gate means, respectively, said first output terminal producing a high level signal when said focus signal indicating front-focus is applied to said comparing means and said second output terminal producing a high level signal when said focus signal indicating rear-focus is applied to said comparing means, and said amount determining means having one output terminal connected to the second inputs of said first and second AND gate means, said one output terminal of said amount determining means producing a control signal for a selected period of time, whereby said control signal is produced from said first AND gate means when said focus signal indicating front-focus is applied to said comparing means, and from said second AND gate means when said focus signal indicating rear-focus is applied to said comparing means.

12. A motor drive lens shifting system as claimed in claim 11, wherein said selected period of time of said control signal being decreased each time said compared two focus signals are not identical to each other.

13. A motor drive lens shifting system as claimed in claim 8, wherein said control means further comprises means for producing a stop signal to stop the rotation of said electric motor when said comparing means produces said comparing signal indicating that said compared two focus signals are not identical to each other.

14. A motor drive lens shifting system as claimed in claim 13, wherein said stop signal producing means comprises a pulse generator for producing a pulse, said electric motor being forced to rotate in an opposite direction by said pulse to provide a braking effect to said focusing lens.

* * * * *

UNITED STATES PATENT OFFICE
CERTIFICATE OF CORRECTION

Patent No. 4,473,743    Dated September 25, 1984

Inventor(s) Norio Ishikawa

It is certified that error appears in the above-identified patent and that said Letters Patent are hereby corrected as shown below:

It is certified that errors appear in the above-identified patent and that said Letters Patent are hereby corrected as shown below:

Column 2, line 41, delete "indicting" and insert --indicating--.

Column 4, line 9, delete "camer" and insert --camera--.

Column 4, line 47, delete "the" and insert --and--.

Column 5, line 32, delete "secondary" and insert --second--.

Column 5, line 59, after "between" insert --the--.

Column 6, line 11, delete "forace" and insert --force--.

Column 6, line 25, delete "36" and insert --26--.

UNITED STATES PATENT OFFICE
CERTIFICATE OF CORRECTION

Patent No. 4,473,743  Dated September 25, 1984

Inventor(s) Norio Ishikawa

It is certified that error appears in the above-identified patent and that said Letters Patent are hereby corrected as shown below:

Column 6, line 30, delete "foccus" and insert --focus--.

Column 6, line 48, after "38a" insert --and--.

Column 6, line 60, delete "inital" and insert --initial--.

column 6, line 63, delete "discrimanated" and insert --discriminated--.

Column 7, line 2, after "34a" insert --and--.

Column 7, line 3, delete "inital and insert --initial--.

Column 7, line 54, delete "34a" and insert --34b--.

Column 7, line 67, delete "gate" and insert --gates--.

UNITED STATES PATENT OFFICE
CERTIFICATE OF CORRECTION

Patent No. 4,473,743           Dated September 25, 1984

Inventor(s)     Norio Ishikawa

It is certified that error appears in the above-identified patent and that said Letters Patent are hereby corrected as shown below:

Column 8, line 23, delete "obtined" and insert --obtained--.

Column 8, line 33, delete "atime" and insert --a time--.

Column 8, line 39, delete "s2" and insert --S2--.

Column 8, line 53, delete "amd" and insert --and in--.

Column 8, line 53, delete "step" and insert --steps--.

Column 8, line 53, delete "operationas" and insert --operation as--.

Column 8, line 58, delete "tobtained" and insert --obtained--.

UNITED STATES PATENT OFFICE
CERTIFICATE OF CORRECTION

Patent No. 4,473,743　　　　　　　　　Dated September 25, 1984

Inventor(s)　　　Norio Ishikawa

It is certified that error appears in the above-identified patent and that said Letters Patent are hereby corrected as shown below:

Column 9, line 3, delete "37".

Column 9, line 25, after "34a" insert --and--.

Column 9, line 27, after "time" insert --,--.

Column 10, line 24, delete "indicate" and insert --indicates--.

Column 10, line 68, delete "1/2 7" and insert --#7--.

Column 10, line 68, to column 11, line 1, delete "Therefter" and insert --Thereafter--.

Column 11, line 6, delete "memont" and insert --moment--.

Column 11, line 17, delete "carrid" and insert --carried--.

Column 11, line 31, delete " 20" and insert --#20--.

UNITED STATES PATENT OFFICE
CERTIFICATE OF CORRECTION

Patent No. 4,473,743　　　　　　　　Dated September 25, 1984

Inventor(s) Norio Ishikawa

It is certified that error appears in the above-identified patent and that said Letters Patent are hereby corrected as shown below:

Column 11, line 68, delete "bettween" and insert --between--.

Column 12, line 66, delete ";" and insert --,--.

Column 14, line 11, delete "controlld" and insert --controlled--.

Signed and Sealed this

Twenty-second Day of April 1986

[SEAL]

Attest:

DONALD J. QUIGG

Attesting Officer　　　　Commissioner of Patents and Trademarks